US006008782A

United States Patent [19]

Chien

[11] Patent Number: 6,008,782

[45] Date of Patent: Dec. 28, 1999

[54] MAPPING APPARATUS FOR USE WITH A CATHODE-RAY TUBE CONTROLLER FOR GENERATING SPECIAL SCREEN EFFECTS

[75] Inventor: Sheng-Feng Chien, Ilan, Taiwan

[73] Assignee: Industrial Technology Research Institute, Hsinchu, Taiwan

[21] Appl. No.: 08/435,690

[22] Filed: May 5, 1995

[51] Int. Cl.[6] ................................ G06F 3/14; G09G 1/16

[52] U.S. Cl. ................................................ 345/28; 345/27

[58] Field of Search ............................ 345/28, 185, 189, 345/10, 27, 127, 200, 188, 190

[56] References Cited

U.S. PATENT DOCUMENTS 4,203,154 5/1980 Lampson et al. ......................... 345/28
4,309,700 1/1982 Kraemer .................................... 345/28
4,570,161 2/1986 Kummer et al. ........................ 345/200
4,754,270 6/1988 Murauchi ................................ 340/731
4,841,453 6/1989 Finlay et al. ............................ 345/127
4,874,164 10/1989 Miner et al. ............................ 345/189
4,940,970 7/1990 Fujisaku .................................... 345/28
5,109,348 4/1992 Pfeiffer et al. .......................... 345/189
5,583,985 12/1996 Kohiyama et al. ..................... 345/185

*Primary Examiner*—Steven J. Saras
*Assistant Examiner*—John Suraci
*Attorney, Agent, or Firm*—W. Wayne Liauh

[57] ABSTRACT

A mapping apparatus is disclosed for showing special effects on screen images. It contains: (a) a line address generator for generating a scanning line position data for every scanning line being processed; (b) a pointer array memory for storing a plurality of attribute addresses, each of the attribute addresses, which can be repeated, being arranged to correspond to one of the scanning lines in a sequential manner; (c) an attribute array memory for storing one or more attribute entries, wherein each of the attribute entries is assigned an attribute address and contains attribute data to be associated with one or more of the scanning lines via the attribute address so as to allow special screen effects to be provided; (d) a multiplexer circuitry for multiplexing a scanning line being processed with one of the attribute entries in accordance with the attribute address corresponding to the scanning line being processed; and (e) a memory address generator for receiving output from the multiplexer means and generating a new memory address for every point of the scanning line being processed. This mapping apparatus allows a variety of special effects, such as window shiftings, reduction/enlargement, rotations, 3D effect, to be provided very cost-effectively with a very simple circuitry.

19 Claims, 9 Drawing Sheets

| | | | | | | | | | | |
|---|---|---|---|---|---|---|---|---|---|---|
| 0 | 1 | . | . | . | n-1 | n | . | . | . | N-1 |
| N | N+1 | . | . | . | N+n-1 | N+n | . | . | . | 2N-1 |
| . | | | | | . | . | | | | . |
| . | | | | | . | . | | | | . |
| . | | | | | . | . | | | | . |
| kN | kN+1 | . | . | . | kN+n-1 | kN+n | . | . | . | (k+1)N-1 |

(Prior Art)

Fig. 1

MAPPING APPARATUS FOR USE WITH A CATHODE-RAY TUBE CONTROLLER FOR GENERATING SPECIAL SCREEN EFFECTS

FIELD OF THE INVENTION

The present invention relates to a mapping apparatus for generating special screen effects on a raster type display. More specially, the present invention relates to a mapping apparatus which is to be used in conjunction with a raster type display controller, such as a cathode-ray tube controller (CRTC) for generating special screen effects on a raster type display, such as a CRT display.

BACKGROUND OF THE INVENTION

A conventional displaying apparatus for displaying an object on a screen typically comprises a line counter, which generates the starting address of each horizontal scanning line. The starting address is sent to a memory counter, wherein the addresses in the frame buffer which correspond, respectively, to the dots, or pixels, constituting the scanning line, are produced. Some display controllers are modified to provide an offset register and a starting address register. These display controllers allow horizontal as well as vertical movements of the displayed images to be effectuated. All these displaying apparatuses are based on the linear manipulation of line addresses corresponding to each scanning line.

Other types of display controllers are also widely used for raster scanning type displays. For example, an image-type display controller has been in TV game equipment for controlling its CRT display. In one of such displays, the CRT is divided into picture (i.e., “image” or “object”) elements in an array of 256×256 dots. A character consisting of 8×8 dots can be displayed in 32×32 locations on the screen. A circuit configuration of this type typically comprises a character ROM and a buffer RAM. The buffer RAM has 32×32 addresses and one address of the buffer RAM corresponds to a position on the screen of the display. When a character is required to be displayed at a position on the screen, a character number thereof (i.e., corresponding to the character) stored in the character ROM must be stored in one address of the buffer RAM corresponding thereto. During the horizontal scanning on the display, one address of the buffer RAM is selected and one byte at every horizontal scanning is read out from the character ROM as the displayed data.

The image-type display controller described above was modified by Murauchi in U.S. Pat. No. 4,754,270, in which the screen resolution of the CRT was increased to 1024 dots by 256 lines (i.e., the horizontal direction is divided in dots four times as many as the former case). In the display controller disclosed by Murauchi, the character ROM stores the display data of one image in 8×8 bits as usual, and the buffer RAM also has a capacity of 32×32 addresses as usual and each address thereof corresponds to the position on the screen display. The horizontal address of the buffer RAM is renewed at every 50 nanoseconds and the vertical address thereof is renewed four times in one horizontal blanking period and twice in one vertical blanking period. Start address data for locating the position of the image on the display is loaded into vertical address and horizontal address counters which are then incremented by a carry output from horizontal and vertical adders, respectively. The adders for the vertical and horizontal addresses repeat adding operations according to predetermined addend data. By setting appropriate addend data, the size of the characters and the associated image on a CRT screen can be enlarged or reduced with respect to a normal size.

Prior to the ’270 patent of Murauchi, a device called VCO (voltage controlled oscillator) was taught in U.S. Pat. No. 4,107,665, in which the oscillation frequency thereof is changed in response to a data from a CPU and the address counter is incremented synchronously with the oscillation output. The higher the oscillation frequency of the VCO, the smaller the object displayed on the screen. Conversely, the longer the oscillation period of the VCO, the longer the addressing time, and thus the larger the size of the displayed object.

While the enlargement/reduction technique taught by the ’270 patent is applicable to a displayed screen image, the voltage controlled oscillator developed in the ’655 patent can be applied to the entire screen. However, since the ratio of image enlargement and reduction of the voltage controlled oscillator of the ’655 patent is exactly the changing rate of the frequency, and the range of the frequency rate change is limited by the capacitor circuit, the enlargement and reduction ratio cannot be increased to a satisfactory extent. Furthermore, neither of the display control apparatus disclosed in the ’270 and ’655 can be applied on a scanning line basis.

SUMMARY OF THE INVENTION

The primary object of the present invention is to provide a mapping apparatus for generating special screen effects on a raster type display. More specially, the present invention is to provide a display control apparatus comprising a scanning line based mapping apparatus in conjunction with a raster type display controller, such as a cathode-ray tube (CRT) controller, for generating special screen effects, such as enlargement/reduction, twisting, 2D and 3D rotations, and 3D effects, etc., on a raster type display, such as a CRT display.

The display controller disclosed in the present invention basically comprises the following items:

(1) A line address generator (i.e., a scanning line counter) to define a physical window from, and as a part of, a virtual window (usually the size of the display screen) and assign a line number (i.e., line count) for the scanning line to be displayed on the screen.

(2) A pointer array memory, which stores pointers pointing to the attribute addresses (i.e., the addresses according to which the attribute entries are stored in a attribute array memory as defined in (d), below) in a sequential manner for each of the scanning lines on a one-to-one basis.

(3) A first offset address (or register) generator for generating a first address offset which will be used to cause an address offset register in the scanning line count.

(4) A first adder for adding the line count from (1) with the first address offset register from (3). The combination of the first offset address generator and the first adder is to cause a shift in the correspondence between the scanning line count and the attribute address pointer so that the scanning line being processed will be assigned a different attribute in a very convenient manner. The same offset is applied to subsequent line counts until a new offset is instructed.

(5) An attribute array memory, which stores at least one attribute entry, such as the starting address offset (ADR), V-bit (V), horizontal offset (OFFSET), and scaling (i.e., enlargement/reduction) parameter (SCALE), to be associated with each scanning line for effectuating desired special screen effects.

(6) A second offset address (or register) generator for generating an address offset register in the attribute address pointer to be corresponded to a scanning line.

(7) Second adder for adding the attribute address from (2) with the second address offset from (6). The combination of the second offset address generator and the second adder is to cause a shift in the correspondence between the attribute address pointer in the pointer array and the attribute address in the attribute array, and thus further change the scanning line and the attribute address so that the scanning line will be assigned a different attribute in, again, a very convenient manner.

(8) Memory address generator, which generates the memory address for to every point of the scanning line being processed.

To allow the vertical offset (i.e., the starting address) to be entered either as an absolute or as a relative value, the display controller further comprises:

(9) a third adder for adding the starting address data attribute with the line count data; and

(10) a multiplexer disposed between the third adder and the memory address generator for selecting between the starting address data attribute (in the case that the starting address is an absolute value) and the output from said third adder (in the case that the starting address is a relative value) in accordance with the V-bit attribute.

In the display control apparatus of the present invention, each scanning line has a corresponding pointer in the pointer array stored in the pointer array memory. Each pointer is the value of an address corresponding to an entry in the attribute array that provides the attributes for each scanning line. The pointer values can be repeated in the pointer array so that different scanning lines can be assigned with the same attribute. This saves the storage requirement in the attribute array. Each entry in the attribute array, or the attribute table, contains the attributes, or parameters, for generating special screen effects for a selected scanning line. A preferred entry contains data of base vertical address, or vertical offset, (ADR), V-bit (V), horizontal offset (OFFSET), and enlargement/reduction parameter (SCALE) for each scanning line. Several pointers can share a common address, i.e., several scanning lines can be made to correspond to the same attribute entry so as to have the same attributes.

Each entry in the attribute array is assigned to a selected scanning line via its corresponding pointer in the pointer array and the attribute address to which the pointer points. A set of these attribute entries are pre-defined in accordance with the intended special screen effects, and each attribute entry is given an attribute address, which is also stored as a pointer in the pointer array. A plurality of such attribute entries constitute an attribute table, or attribute array. However, an attribute array containing only one attribute entry may be adequate, although only very limited manipulation will be provided. By using the first adder and the first offset register generator, the attribute entry to be assigned to a selected scanning line, or a cluster of scanning lines, can be quickly updated. The provisions of the first adder and the first offset generator also enhance the range that can be mapped using the present invention.

Every scanning line has a corresponding pointer in the pointer array in a sequential and one-to-one manner. As described above, the corresponding pointer, or attribute address, is determined by the output from the first adder. The attribute address from the pointer array, however, is only a base address, because its value can be modified by the address offset register from the second offset address generator to obtain the final attribute address to be used in the attribute array. With the final attribute address, scanning line attributes such as SCALE, OFFSET, V, ADR, etc. are read out, from the attribute array, to the memory address generator. After the attribute array, the starting address ADR and the output from the line counter are multiplexed as input to a multiplexer, with the output being selected by the value of the V-bit. The memory address generator performs the function of horizontal enlargement/reduction based on the SCALE data, while the OFFSET data provide the instructions for the window to move horizontally, and the ADR data provides the instructions for vertical shift.

To illustrate the operation of the mapping apparatus of the present invention, it is helpfiil to contrast the present invention with the conventional line-based address mapping method and mapping apparatus. For a VGA screen or the like (such as super VGA, et al), a window of k+1 scanning lines can be expressed as shown in FIG. 1, wherein N is the width of the virtual window (i.e., the offset between the starting addresses of two adjacent scanning lines), n is the width of the physical window 3, and k is the height of the window minus 1 (i.e., the window has k+1 lines). The memory location [X, Y] for each pixel, which is typically one byte in length, is N*Y+X. This involves a simple one-to-one mapping procedure. The conventional mapping method is typically implemented by using a starting address register 1 and a line offset register 2, as shown in FIG. 2, so as to show the pixels of the selected physical window 3. In FIG. 2, data of starting address register, which controls the base starting address of the scanning line, and the line offset register, which controls the offset between two adjacent scanning lines (i.e., the end of a scanning line and the beginning of the next scanning line), are fed into Counter 1. Counter 1 counts the number of points (up to the width of the physical window n). When the number of data points exceeds the width of the window, it starts the second scanning line, and the line offset register (i.e., N) is taken into account in the pixel count (i.e., by adding N to the starting address). Counter 2 counts the number of scanning lines processed (up to the height of the physical k), to signal the end of the window. The pixel positions of the physical window are then fed into a memory.

FIG. 1 can be considered as representing a special implementation (with much limited features) of the present invention in which both the starting address register and the line offset register are constant. The sequence of the displayed pixels corresponding to FIG. 1 can be expressed as follows:

$$\left.\begin{matrix} 0, 1, \ldots, n-1 \\ N, N+1, \ldots, N+n-1 \end{matrix}\right\} \text{Offset} = N \qquad \text{First two lines}$$

$$\vdots$$

$$\left.\begin{matrix} (k-1)N, (k-1)N-1, \ldots (k-1)N+n-1 \\ kN, kN+1, \ldots, kN+n-1 \end{matrix}\right\} \text{Offset} = N \qquad \text{Last two lines}$$

With a non-zero, but constant, starting address register, the above described case is similar to the effect of horizontal panning (H.panning). For example, with an H.panning of one, the sequence of the displayed pixels are as follows:

$$1, 2, \ldots, n-1, n$$

$$N+1, N+2, \ldots, N+n-1, N+n$$

$$\vdots$$

$$kN+1, kN+2, \ldots, kN+n-1, kN+n$$

With the method disclosed in the present invention, the starting address register and the line offset register are made variables to be corresponded to each and every scanning line. In practice, these offset data (horizontal and vertical offsets) are provided as, at least, a part of an entry in a table, each entry (stored in the attribute array) is assigned a pointer address (stored in the pointer array) corresponding to a scanning line. Each entry thus becomes an attribute of a scanning line. Different pointer addresses, or different scanning lines, can share the same entry (i.e., sharing the same attribute). By manipulating the starting address register and the line offset register, one can cause vertical and/or horizontal shift of the physical window. By using variable starting address register, one can also produce a wavy window. Furthermore, other parameters, such as reduction/enlargement, x-y pixel movement, etc, can be provided so as to cause perspective and 2D/3D rotation effects. These will be discussed below.

In the mapping apparatus of the present invention, the pointer array and attribute array can be stored in RAM, so as to reduce the complexity of the required hardware and allow for flexibility. On the other hand, the first offset address generator and the second offset address generator, and the various adders and multiplexers can be designed into the cathode-ray tube controller (CRTC), so as to reduce the chip count of the final hardware. As to the memory requirement, since each scan line must have its own entry (i.e., one pointer in the pointer array), for an NTSC (National Television Systems Committee) display system, there must be at least 525×N bytes, N is the size of the pointer in the pointer array. Preferably, N is 2 bytes; therefore, the memory size required for the pointer array is at least 1K byte. In order allow room for the first offset generator to operate, the memory size must greater than 1K. As to the attribute array, since several scanning lines can share a common one attribute; therefore, a minimum of one entry is required for the attribute array. Furthermore, since the frequency in the horizontal scanning in an NTSC system (525 lines, interlaced at 30 frames/sec) is 15.7 k Hz (i.e., a maximum number of 525×30, or 15.7 k, scanning lines per second), the CPU only has to update the attribute at most 15.7 k times per second.

BRIEF DESCRIPTION OF THE DRAWING

The present invention will be described in detail with reference to the drawing showing the preferred embodiment of the present invention, wherein:

FIG. 1 is a schematic diagram of a conventional mapping method typically used in a VGA display.

DETAILED DESCRIPTION OF THE PREFERRED EMBODIMENT

Figure 2:
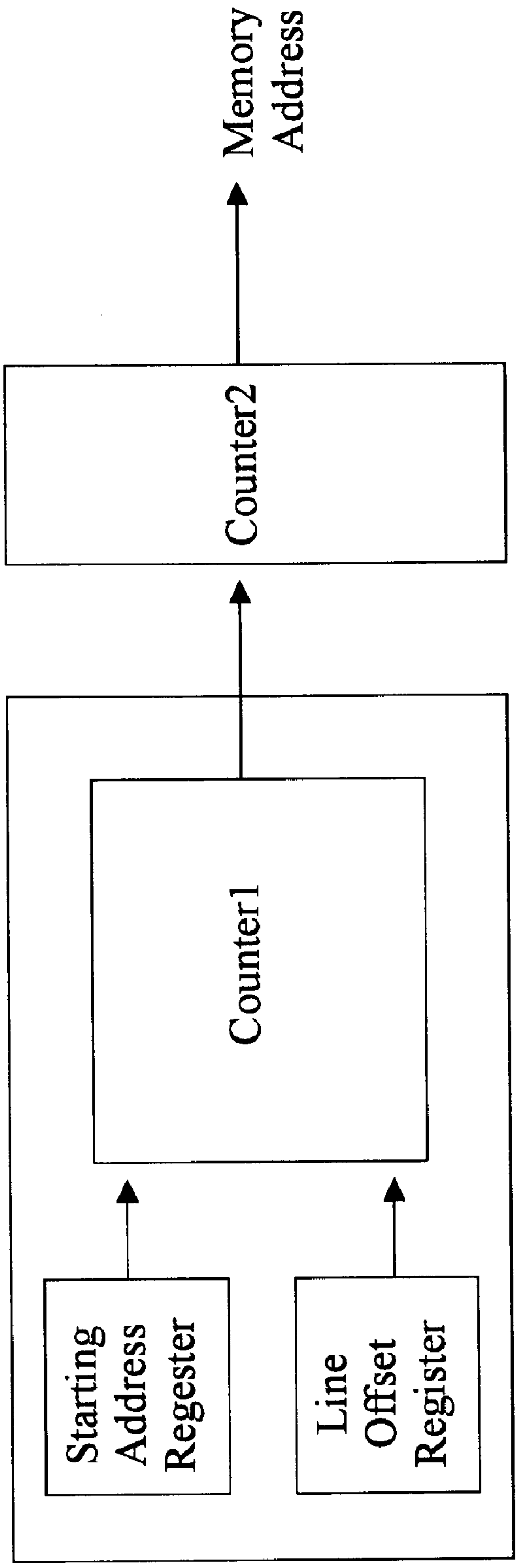
(Prior Art) Fig. 2
FIG. 2 is a schematic diagram of a enhanced conventional mapping method allowing horizontal shift of the scanning lines.

The present invention discloses a mapping apparatus, and a display controller incorporating such mapping apparatus, for generating special images on a raster type display such as a CRT display. In the display control apparatus of the present invention, each scanning line has a corresponding pointer in the pointer array stored in the pointer array memory. Each pointer is an address pointing to an entry in the attribute array that provides the attributes for each scanning line. Each entry in the attribute array contains the attributes, or parameters, for generating special screen effects. A preferable entry in the attribute array contains data of base address offset (ADR), V-bit (V), horizontal offset (OFFSET), and enlargement/reduction parameter (SCALE) for each scanning line. Several pointers can share a common address, i.e., several scanning lines can have the same attributes.

Now referring to the drawings, FIG. 1 is a schematic diagram of a conventional mapping method typically used in a VGA display. For a VGA screen, a window of k+1 scanning lines is expressed as shown in FIG. 1, wherein N is the width of the virtual window, n is the width of the physical window, and k is the height of the window minus 1. The memory location [X, Y] for each pixel, which is typically one byte in length, is N*Y+X. This involves a simple one-to-one mapping procedure. Typically, all what are required in the memory input are the starting address of the physical window, the width of the physical window, and the offset N.

FIG. 2 is a schematic diagram showing how the conventional mapping to the memory is achieved for a physical window 3. The conventional mapping method as shown in FIG. 1 is shown to have a starting address register 1, which provides the starting address for the first scanning line, and the line offset register, which controls the offset of the starting address of the next scanning line, are fed into Counter 1. Counter 1 counts the number of points (i.e., the width of the physical window n). When the number of data points exceeds the width of the window, it starts the second scanning line, and the line offset register is added to the pixel count of the previous scanning line. Counter 2 counts the number of scanning lines processed (i.e., the height of the physical k), to signal the end of the window. The pixel positions of the physical window are then fed into a memory. As discussed previously, the conventional mapping method as shown in FIG. 1 can be considered as a special implementation of the present invention (with many of the features turned off) in which all the scanning lines share a common, fixed, entry: i.e., base address offset (ADR)=0, V-bit (V)=0 (all based on relative memory counter), horizontal offset (OFFSET)=0, and enlargement/reduction parameter (SCALE)=1 for each and every scanning line. The common H.panning technique can be considered as another special implementation which does not contain the pointer array or the attribute array required in the present invention, and in which only a common attribute, which contains a non-zero fixed OFFSET value, is allowed which is to be shared by all the scanning lines. The present invention, however, allows much more complicated special screen effects to be presented without incurring large additional hardware/computational expense.

Figure 3:
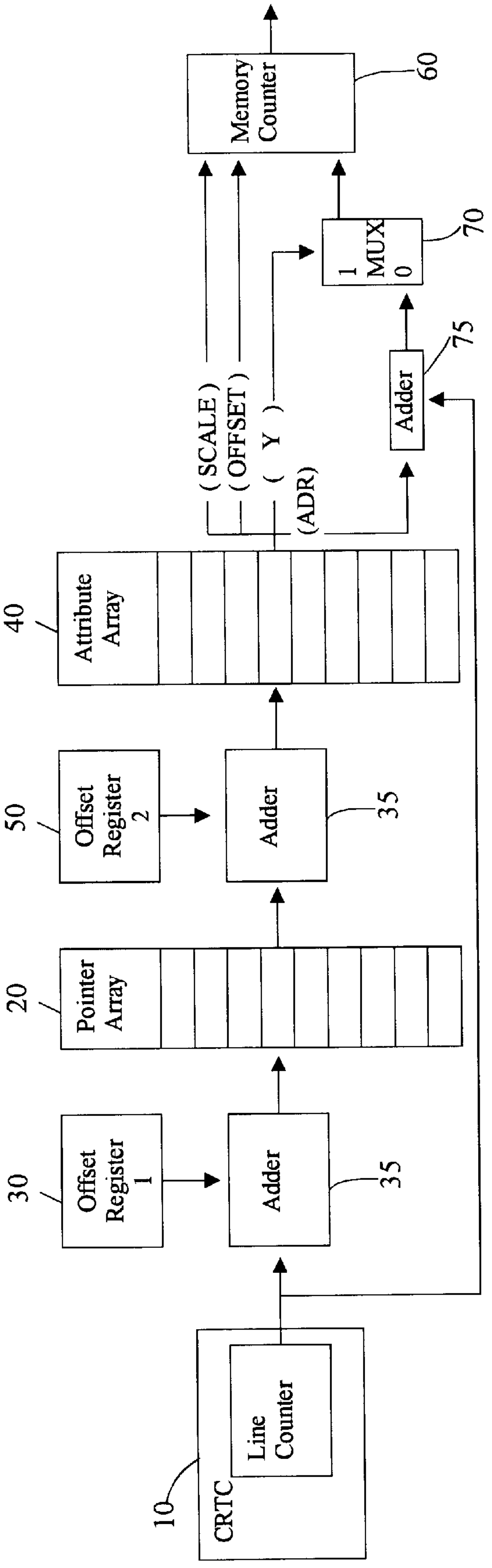
FIG. 3 is a schematic diagram of the mapping apparatus and method of the present inventing.

FIG. 3 is a schematic diagram of the mapping apparatus and method of the present invention. The display controller disclosed in the present invention basically comprises (a) a line address generator (i.e., a scanning line counter) 10 to indicate the position (i.e., scanning line count) of the current scanning line; (b) a pointer array memory 20, which stores the attribute address pointers for each of the scanning lines; (c) a first offset register generator 30 providing an address offset register in the scanning line count, (d) a first adder 35 for adding the scanning line count from (a) with the first address offset register from (c); (e) an attribute array memory 40, which stores entries of attributes such as starting address (ADR), V-bit (V), horizontal offset (OFFSET), and enlargement/reduction parameter (SCALE), etc. to be assigned to each scanning line for special screen effects; (f) a second offset register generator 50 for providing an address offset register in the pointer to be corresponded to an attribute address stored in the attribute array 40, (g) a second adder 55 for adding the attribute address from (b) with the second address offset register from (f); (h) a third adder 75 for adding ADR with line counter output data; (i) a multiplexer 70 for selecting either ADR or the output from the third adder 75 based on the V-bit data; and (j) a memory address generator 60, which generates the memory address for every pixel of the scanning line to be displayed on the screen.

In the display control apparatus of the present invention, each scanning line has a corresponding pointer in the pointer array stored in the pointer array memory 20. Each pointer is an address corresponding to an entry in the attribute array that provides the attribute for each scanning line. Each entry in the attribute array contains the parameters, or attributes, for generating special screen effects for a selected scanning line. A preferred entry contains attribute data such as: starting address (ADR), V-bit (V), horizontal offset (OFFSET), and enlargement/reduction parameter (SCALE) for each scanning line. Several pointers can share a common address, i.e., several scanning lines can have the same attributes. The input of V-bit is either 0 or 1, its purpose is to determine whether the ADR data is a related to the direct memory counter address or the relative memory address. If V-bit is 1, then the ADR address is direct (or absolute). On the other hand, if V-bit is 0, then the ADR address is a relative base address, and the starting counter of each scanning line, before considering the effect of the horizontal offset, must be added with the value of ADR+line_number× N, wherein line_number is line number and N is the width of the virtual window as shown in FIG. 1. Since the width of the virtual window is typically the width of the display device and can often be expressed as $2^m$ (i.e., 512, 1024, etc; m=1 $n_2$N), it can be considered that each scanning is being shifted by ADR+line_number×$2^m$, the ADR can be considered as a "vertical shift", or "vertical offset". In summary, the starting address of memory counter for each scanning line can be expressed as follows:

starting memory counter address=(V)?ADR:ADR+line_number× $2^m$

This means that:

if (V) then starting memory counter address = ADR;

else starting memory counter address = ADR + line_number × $2^m$

For complicated screen effects (such as perspective view, or 2D/3D rotations), absolute vertical shifts (i.e., V-bit=1) are preferred.

As shown in FIG. 3, the ADR data and the line counter data (line number) are input into the third adder 75, and both the ADR data and the output from the third adder 75 are input into multiplexer 70, whose output is controlled by the V-bit data. Note that only the SCALE and OFFSET data, and the output from multiplexer 70 (which is either ADR or ADR+line_number×$2^m$ ) are sent to the memory counter 60. The vertical offset can also be expressed as the number of offset lines, ADL. In such case, the vertical shift would be (ADL+line_number)×$2_m$.

In the mapping apparatus as shown in FIG. 3, each entry in the attribute array is shown as a row in an "attribute table" to be assigned to a selected scanning line. Several of these attribute entries are defined apriori by the user and grouped togegher sequentially as an attribute array, or attribute table. Each attribute entry is assigned an attribute address (pointer) in the pointer array. The attribute table can be generated by software and stored in RAM, or fixed in ROM if so desired. By using the first adder and the first offset register generator, the attribute table to be assigned to a selected set of scanning lines can be quickly updated by the user. Collectively, the provisions of the first adder and the first offset generator also enhance the mapping range that can be achieved by the present invention.

Every scanning line has a corresponding pointer in the pointer array 20. As described above, the corresponding pointer, which also corresponds to a specific attribute entry in the attribute array, of a scanning line is determined by the output from the first adder 35. The attribute address from the pointer array 30 provides a base address, whose value will be modified by the address offset register from the second offset address generator 50 to obtain the "final attribute address" for use in the attribute array 40. With the final attribute address, scanning line attributes, such as SCALE, OFFSET, V, ADR, etc., are read out from the attribute array 40 and to the memory address generator 60. The memory address generator 60 performs the functions of enlargement/ reduction based on the SCALE data, while the OFFSET data provides data for the screen to be shifted horizontally, and the ADR data provides data for vertical shifting (i.e., vertical movement) of the scanning line. The starting address data, the OFFSET data (as read out from the attribute array), and the SCALE data (also read out from the attribute data), which are provided by the attribute array 40, and the processed (via third adder 75) or un-processed ADR data, the selection of which is determined the the V-bit data via the multiplexer 70, are input to the memory counter 60 to provide the final memory addresses so as to allow the constituting pixels, or dots, of each scanning line to be displayed on the screen.

In the mapping apparatus of the present invention, the pointer array memory and the attribute array memory can be stored in RAM of the microprocessor, so as to reduce the complexity of the hardware required. The attribute array can be fixed and stored in ROM. On the other hand, the first offset address generator (which provides an offset register) and the second offset address generator (which also provides an offset register), and the various adders and/or multiplexer can be designed into the cathode-ray tube controller (CRTC), so as to reduce the chip count of the mapping apparatus. As to the memory requirement, since each scan line must have its own entry (i.e., one pointer in the pointer array), thus, for an NTSC (National Television Systems Committee) display system, there must be at least 525×N bytes—N being the size of a pointer address in the pointer array. Preferably, each pointer address N has 2 bytes; therefore, the memory size required for the pointer array is at least 1K byte. As to the attribute array, since several scanning lines can share a common one attribute; therefore, a minimum of one entry is required for the attribute array. However, in order for the first and second offset generators to operate, two or more entries are required. In a preferred embodiment, each attribute is 16 bytes, and the attribute array is allocated 64K memory.

Since the frequency in the horizontal scanning in an NTSC system (525 lines, interlaced) is 15.7 k Hz (i.e., a maximum number of 15.7 k scanning lines per second at 30 frames/sec), the CPU only has to update the memory addresses at most 15.7 k times per second. Because of the relatively low refreshing rate required by the present invention, which utilizes adders rather using the conventional multiplier implementation, a power consumption of up to one-half or one-quarter of what would be required of a conventional system can be saved. The present invention also reduces the die size of a wafer, thus reducing the manufacturing cost. In the preferred embodiment described above, the memory sizes for the pointer and the attribute entry are 2 and 16 bytes, respectively, at 15.7 k per second, only about 280 KB per second of addition data will need to be processed.

The present invention will now be described more specifically with reference to the following examples. It is to be noted that the following descriptions of example including preferred embodiment of this invention are presented herein for purpose of illustration and description; it is not intended to be exhaustive or to limit the invention to the precise form disclosed.

EXAMPLE 1

Figure 4:
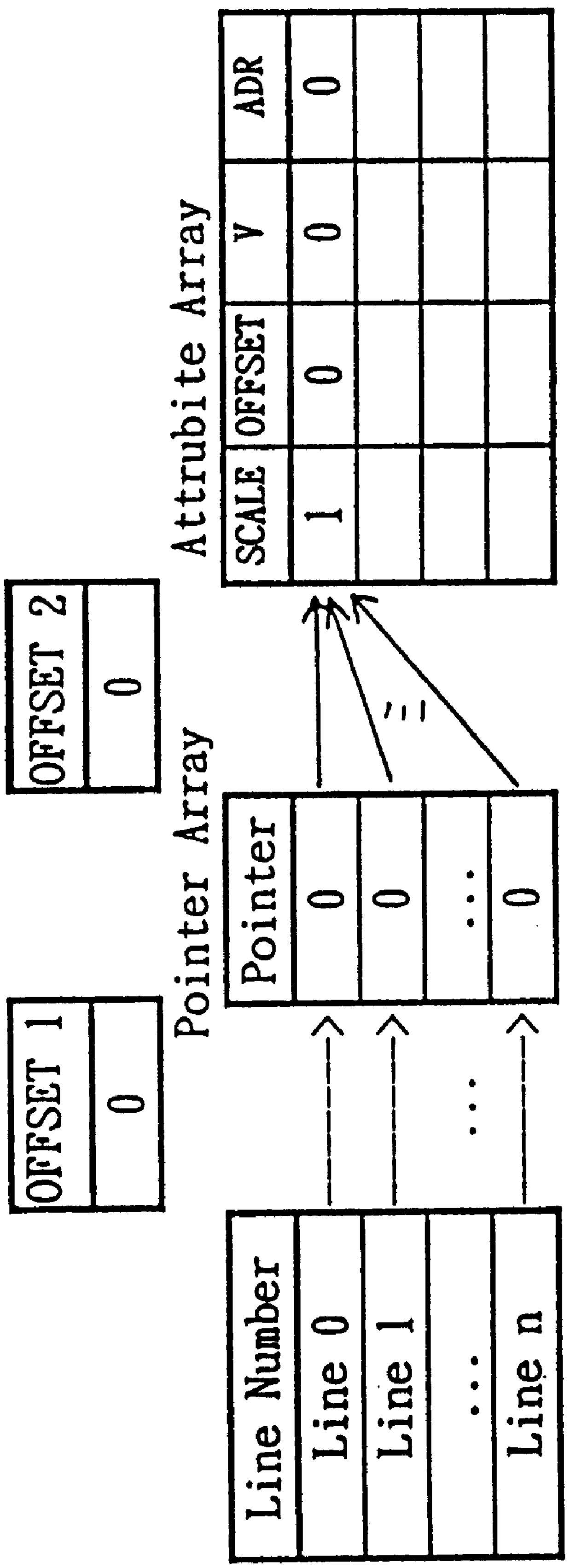
FIG. 4 is a schematic diagram of an embodiment of the mapping apparatus and method of the present invention without any special effect.

FIG. 4 is a schematic diagram of an embodiment of the mapping method of the present invention, without any special effect. Both of the first and second offset register generators 30, 50 are either turned off or left idled. Every scan line has a corresponding pointer (i.e., address or register) in the pointer array, which data are stored in the pointer array memory 20. In this example, all the pointers share a common attribute address, as shown by the arrows in FIG. 4—all pointing to the same entry in the attribute table. Since no special screen effects are intended in this example, the corresponding common attribute entry has a SCALE of 1 (i.e., no enlargement or reduction), a V of 0 (i.e, relative base address will be used), an OFFSET of 0 (i.e., no horizontal shift), and an ADR of 0 (i.e., no base vertical shift).

EXAMPLE 2

Figure 5:
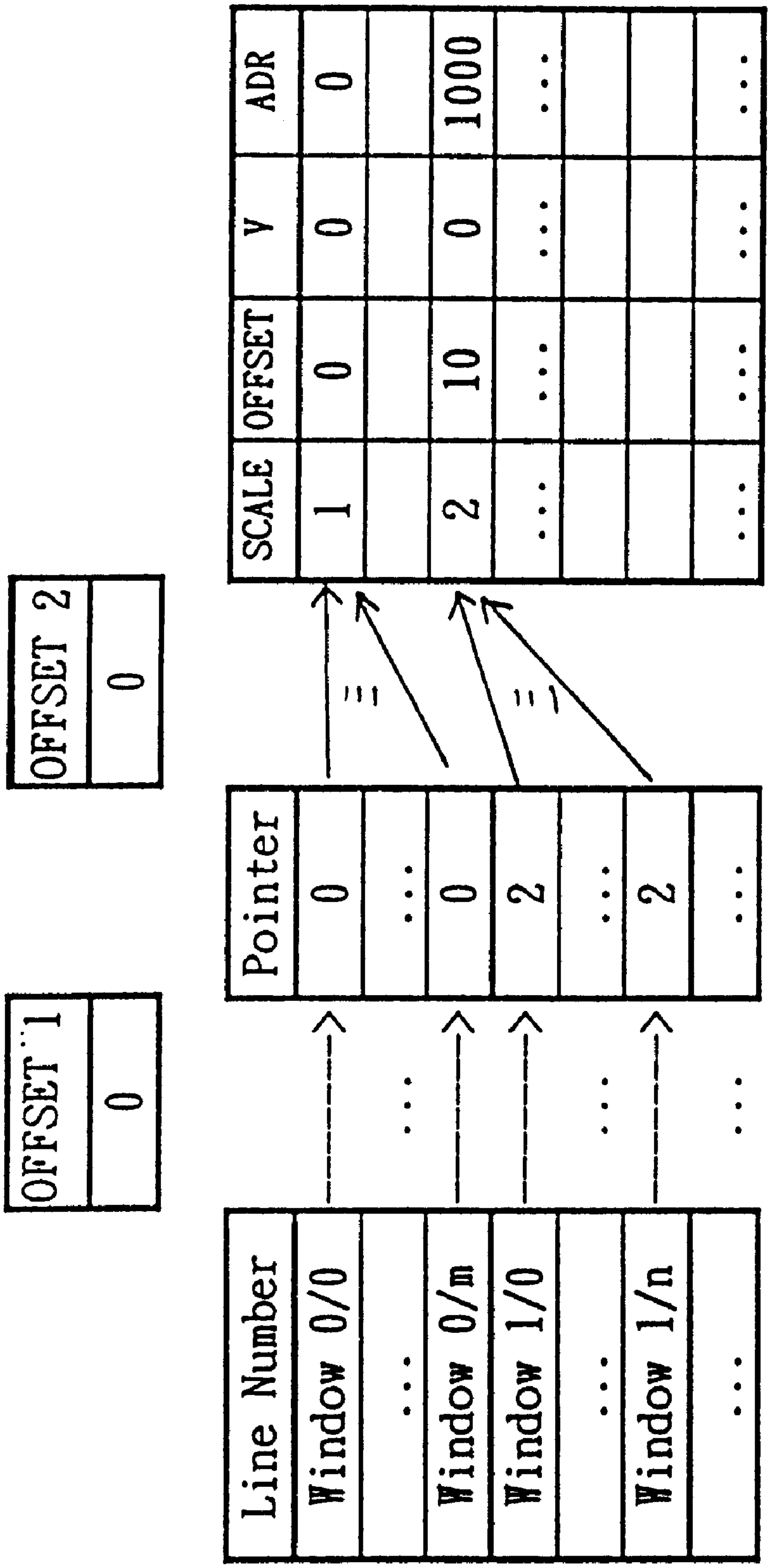
FIG. 5 is a schematic diagram of another embodiment of the mapping method of the present invention showing multiple windows, each window has its own attribute.

FIG. 5 is a schematic diagram of another embodiment of the mapping method of the present invention showing two windows. The scanning lines of each window are assigned to respective pointers. As shown in FIG. 5, all the scanning lines in the same window have the same address pointer. However, they can be assigned to different pointers. The first window (window "0") has m+1 scan lines, all of them are assigned to the same address pointer of "0" (i.e., to the 0th attribute entry in the attribute array). On comparison, the second window (window "1") has n+1 scan lines, all of them are assigned to an address pointer of "2"(i.e., to the 2nd attribute entry in the attribute array). The first window is a "normal" window; whereas, the second window has a SCALE of "2", a horizontal shift of "10", and a vertical shift of "1,000". Of course, other attribute values can be assigned.

EXAMPLE 3

Figure 6A:
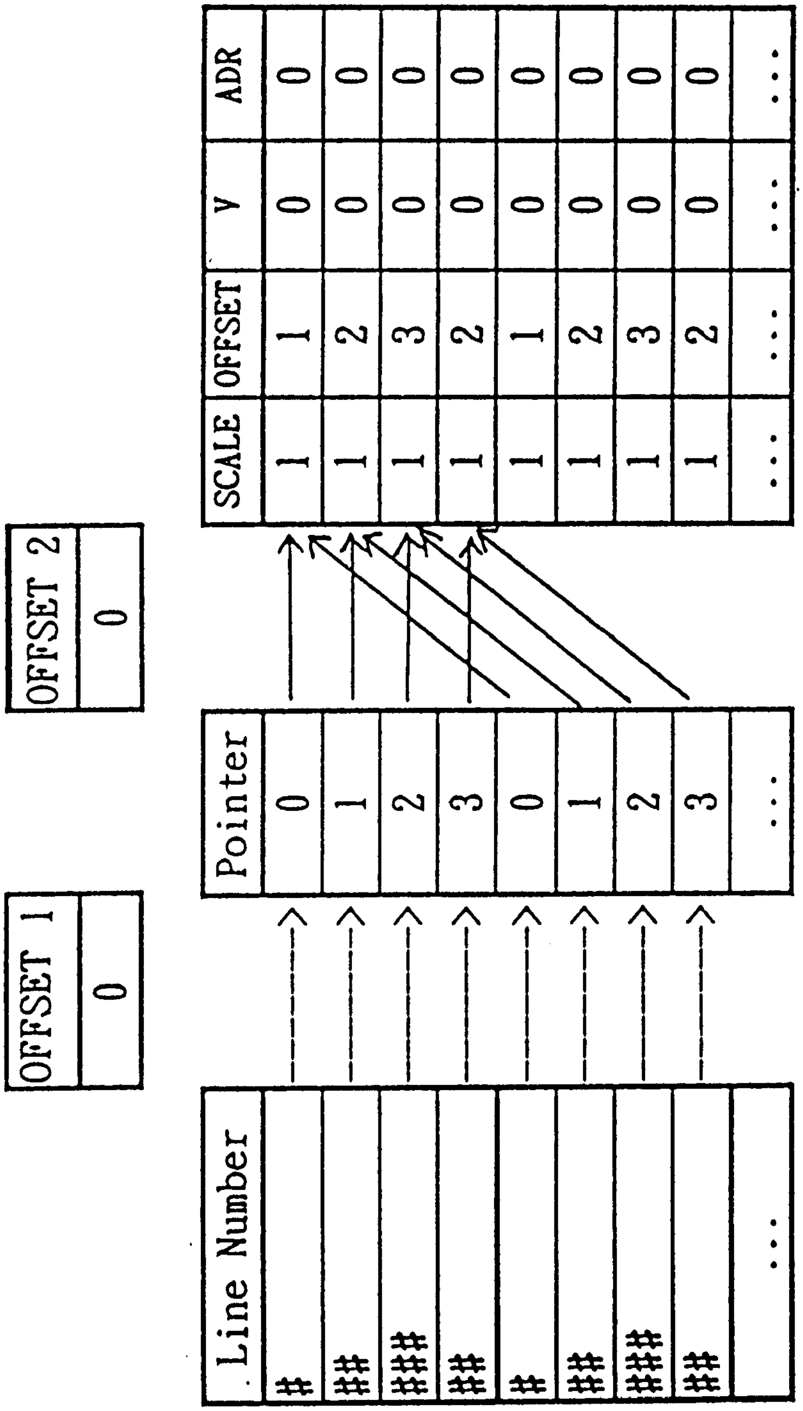
FIG. 6A is a schematic diagram of yet another embodiment of the mapping method of the present invention showing multiple windows, each window has its own attribute to exhibit a wavy screen effect.

FIG. 6A is a schematic diagram of yet another embodiment of the mapping method of the present invention showing multiple windows. The scanning lines in the first window correspond to respective pointers in the pointer array. The OFFSET (i.e., horizontal shift) values for these pointers increase then deceases (the OFFSET values are 1, 2, 3, and 1, respectively, from first to fourth line). By the manipulation of the OFFSET values, the scanning lines are provide with a "wavy" effect, as indicated in FIG. 6 (the # sign indicating blank space). In this example the scanning lines of the second window are assigned to the same set of pointers such that the same wavy effect is repeated.

EXAMPLE 4

Figure 6B:
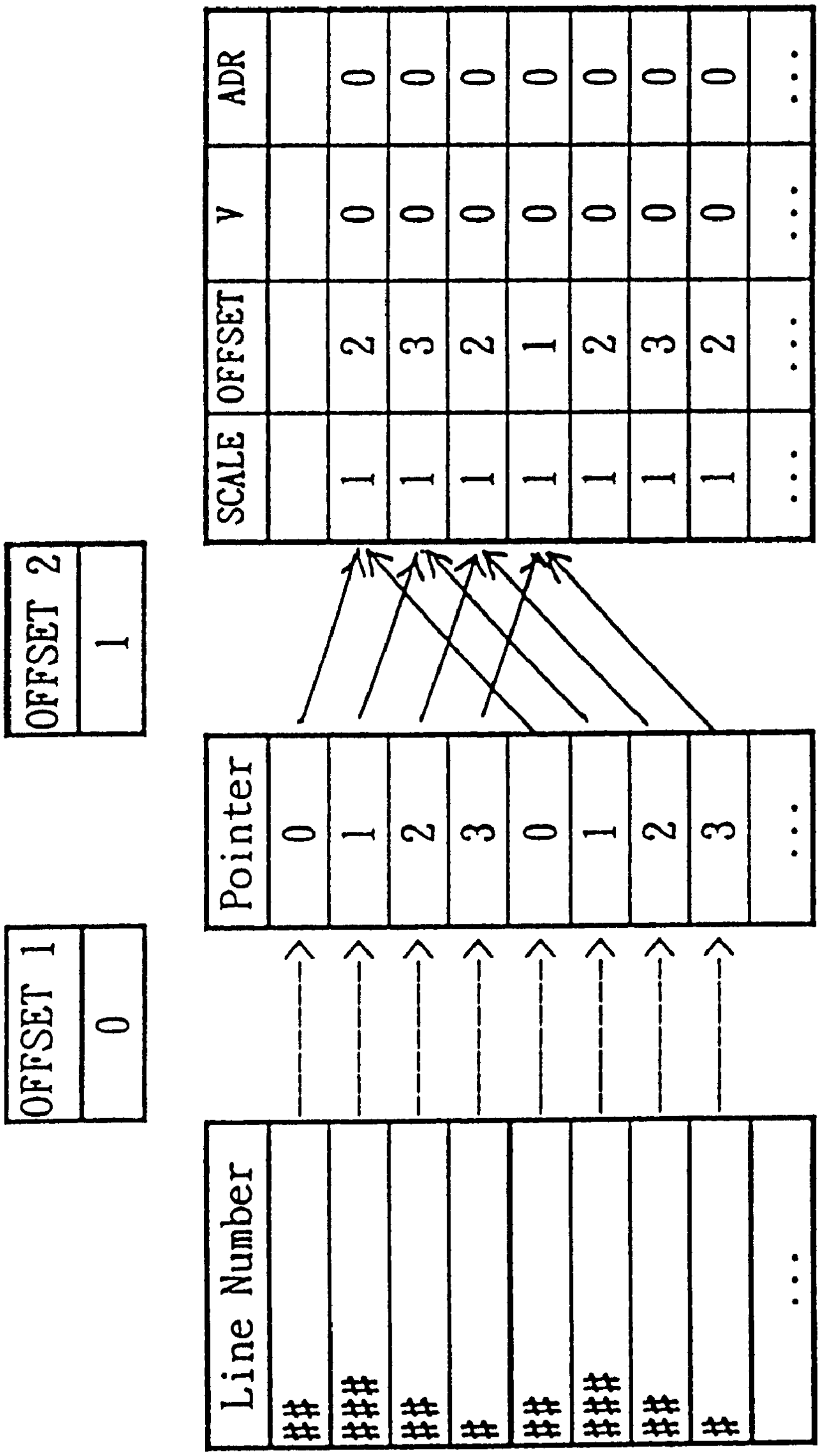
FIG. 6B is a schematic diagram of yet another embodiment of the mapping method of the present invention showing multiple windows, each window has its own attribute to exhibit a different wavy screen effect from FIG. 6A.
Figure 7:
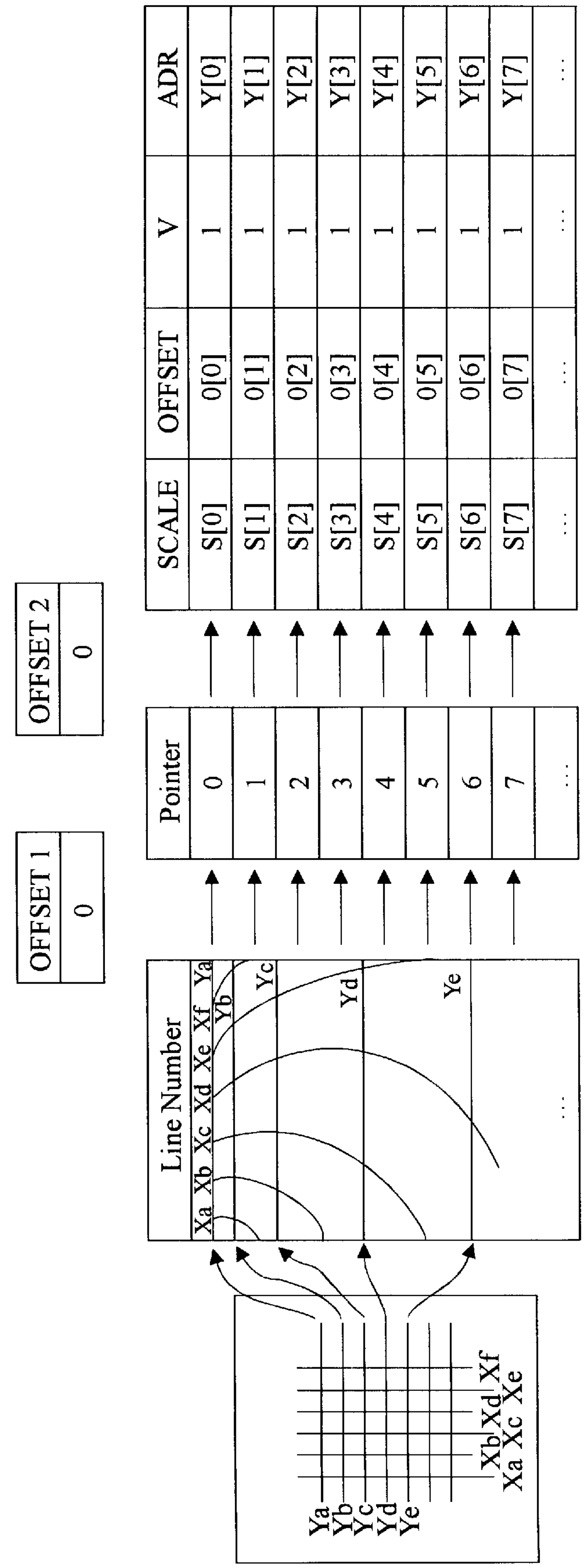
FIG. 7 is a schematic diagram of an embodiment of the mapping method of the present invention which causes a rectangular window to exhibit a 3-D perspective view.

FIG. 6B is a schematic diagram of yet another embodiment of the mapping method of the present invention showing multiple windows. The scanning lines in both windows correspond to the same pointers as described in FIG. 6, and the same attribute array as in Example 3 is used in this example. The main difference between this example and Example 3, however, is that the second offset address generator is caused to generate an offset register of "1". This causes all the attribute addresses from the pointer array to be incremented also by "1". As shown in FIG. 7, a different wavy effect is obtained.

EXAMPLE 5

FIG. 7 is a schematic diagram of an embodiment of the mapping method of the present invention which causes a rectangular window to exhibit a 3-D perspective view. In this example, each scanning line is accorded with an individual set of SCALE (from S[0], S[1], . . . to S[k]), OFFSET (from O[0], O[1], . . . a to O[k]), and ADR (from Y[0], Y[1], . . . to Y[k]). Since this example involves a greater degree of manipulation, the ADR values are based on absolute shifting; therefore, all the attributes have V-bit of one. The screen can also caused to move (forward or backward) or jump to a different scene by simply entering appropriate values of OFFSET 1 and OFFSET 2.

EXAMPLE 6

Figure 8:
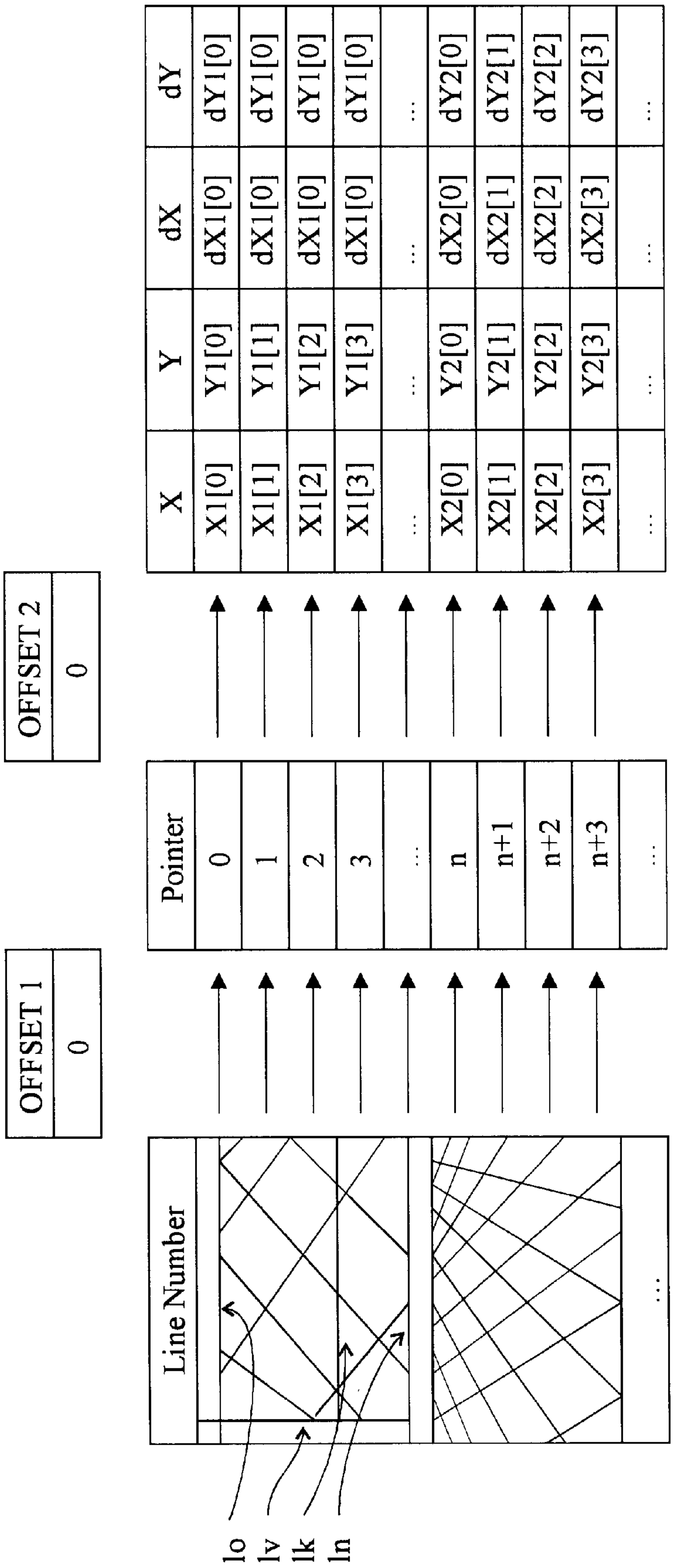
FIG. 8 is a schematic diagram of an embodiment of the mapping method of the present invention which utilizes attributes of X, Y, dX, and dY to cause a rectangular window (of k scanning lines) to do a 2-D or 3-D rotation.

The attribute array can contain different types of attributes. FIG. 8 is a schematic diagram of an embodiment of the mapping method of the present invention which utilizes attributes of X, Y, dX, and dY to cause a rectangular window (of k scanning lines) to do a 2-D rotation, or a 3-D rotation (i.e., a 2-D rotation plus perspective effect). In this embodiment, X and Y are the absolute horizontal and vertical offsets, respectively, of each scanning line (i.e., the horizontal and vertical positions of the first pixel after a 2-D rotation), dY/dX is the slope of the rotated line, and |(dX, dY)| represents the enlargement/reduction parameter in the 2-D image display. For illustration purposes, we look at three scanning lines $1_0$, $1_i$, and $1_k$ . The starting position (coordinates) of scanning line $1^0$ is (X1[0], Y1[0]) in the first window. Similarly, The starting position (coordinates) of scanning line $1_i$ (X1[i], Y1[i]). In the 2-D rotation (which can be considered as a top view) as shown in FIG. all the scanning lines have the same slope, i.e., slopeof line $1_0$=slope of line $1_i$=slope of line $1_k$=dY1[0]/dX1[0 ]. As shown in the second window of FIG. 7, by using different values of dX and dY, a 3-D rotation can be achieved to provide a perspective effect.

The mapping apparatus/method disclosed in the present invention has several advantages in that: (a) it can be applied to 2D/3D screen using linear manipulations to provide the effects of twisting, distortion, etc., for the screen images; (b) the special effects can be provided by software programming, using a single coordinate system; (c) multiple screen effects can be provided; and (d) its operation does not require a multiplier, thus simplifies the manufacturing procedure.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A mapping apparatus for use with a raster type display controller for displaying an image on a raster type display, said raster type display comprising a plurality of scanning lines, each of said scanning lines being represented by a scanning line position and comprising a plurality of points, and each point being represented by a pixel position in said scanning line, said mapping apparatus comprising:

(a) a line address generator for generating a scanning line position data and pixel position data for a scanning line being processed;

(b) a pointer array memory for storing a plurality of attribute addresses, each of said attribute addresses, which can be repeated, being arranged to correspond to one of said scanning lines in a sequential manner;

(c) an attribute array memory for storing one or more attribute entries, each of said attribute entries is assigned an attribute address and contains attribute data to be associated with one or more of said scanning lines via said attribute address so as to allow special screen effects to be provided;

(d) a multiplexer means for multiplexing a scanning line being processed, which is represented by a scanning line position data, with one of said attribute entries in accordance with the attribute address corresponded to said scanning line being processed; and (e) a memory address generator for receiving output from said multiplexer means and generating a new memory address for every point of said scanning line being processed.

2. A mapping apparatus according to claim 1 which further comprises a first offset address generator means for causing a first address offset in said scanning line count so as to shift the correspondence between said scanning line and said attribute address pointer in said pointer array memory.

3. A mapping apparatus according to claim 2 wherein said first offset address generator means comprises a first address offset generator and a first adder, said first adder being provided for adding said scanning line count with a first offset register generated by said first address offset generator.

4. A mapping apparatus according to claim 1 which further comprises a second offset address generator means for causing a second address offset in said attribute address pointer so as to shift the correspondence between the attribute address pointer and the attribute address and change the attribute entry to be assigned to said scanning line being processed.

5. A mapping apparatus according to claim 4 wherein said second offset address generator means comprises a second address offset generator and a second adder, said second adder being provided for adding said attribute address pointer with a second offset register generated by said second address offset generator.

6. A mapping apparatus according to claim 1 which further comprises first and second offset address generator means for causing first and second address offsets in said scanning line count and said attribute address pointer, respectively.

7. A mapping apparatus according to claim 6 wherein:

(a) said first offset address generator means comprises a first address offset generator and a first adder, said first adder being provided for adding said scanning line count with a first offset register generated by said first address offset generator so as to shift the correspondence between said scanning line and said attribute address pointer in said pointer array memory; and (b) said second offset address generator means comprises a second address offset generator and a second adder, said second adder being provided for adding said attribute address pointer with a second offset register generated by said second address offset generator so as to shift the correspondence between the attribute address pointer and the attribute address and change the attribute entry to be assigned to said scanning line being processed.

8. A mapping apparatus according to claim 1 wherein said pointer array memory and said attribute array memory are provided in a RAM of a microprocessor.

9. A mapping apparatus according to claim 1 wherein said pointer array memory is provided in a RAM and said attribute array memory is provided in a ROM.

10. A mapping apparatus according to claim 1 wherein each of said attribute entries comprises a horizontal offset data attribute for providing horizontal shift instructions for a scanning line.

11. A mapping apparatus according to claim 1 wherein each of said attribute entries comprises a scaling data attribute for providing enlargement/reduction instructions for a scanning line.

12. A mapping apparatus according to claim 1 wherein each of said attribute entries comprises a starting address data attribute for providing a vertical shift attribute for a scanning line.

13. A mapping apparatus according to claim 12 wherein each of said attribute entries further comprises a V-bit attribute so as to allow said starting address data attribute to be entered as either absolute or relative values.

14. A cathode-ray tube controller for displaying an image on a cathode-ray tube display, said cathode-ray tube display comprising a plurality of scanning lines, each of said scanning lines being represented by a scanning line position and comprising a plurality of points, and each point being represented by a pixel position data in said scanning line, said cathode-ray tube controller comprising:

(a) a line address generator for generating a scanning line position data and pixel position data for a scanning line being processed;

(b) a pointer array memory for storing a plurality of attribute addresses, each of said attribute addresses, which can be repeated, being arranged to correspond to one of said scanning lines in a sequential manner;

(c) an attribute array memory for storing one or more attribute entries, each of said attribute entries is assigned an attribute address and contains attribute data to be associated with one or more of said scanning lines via said attribute address so as to allow special screen effects to be provided;

(d) a multiplexer means for multiplexing a scanning line being processed, which is represented by a scanning line position data, with one of said attribute entries in accordance with an attribute address corresponded to said scanning line being processed; and (e) a memory address generator for receiving output from said multiplexer means and generating a new for every point of said scanning line being processed;

(f) a first address offset generator and a first adder for causing an address offset in said pointer array memory;

(g) a second address offset generator and a second adder for causing an address offset in said pointer array memory.

15. A cathode-ray tube controller for displaying an image on a cathode-ray tube display, said cathode-ray tube display comprising means for displaying a plurality of scanning lines, each of said scanning lines comprising a plurality of pixels, each pixel being represented by a linear pixel position, wherein said cathode-ray tube controller comprising:

(a) a line counter for generating a scanning line count data for a scanning line being processed;

(b) an attribute array memory for storing one or more attribute entries, each of said attribute entries is stored in accordance with its attribute address in said attribute array memory and contains attribute data to be associated with one or more of said scanning lines so as to allow special screen effects to be provided therefor;

(c) a pointer array memory for storing a sequence of attribute address pointers each pointing to an attribute address to be associated with a scanning line;

(d) a memory address generator for receiving said attribute entry from said attribute array memory corresponding to a scanning line being processed via said pointer and said attribute address and generating a memory address for every pixel of said scanning line being processed in accordance with instructions contained in said attribute entry so as to generate one or more special screen effects;

(e) a first address offset generator and a first adder, said first adder being provided for adding said scanning line count with a first offset register generated by said first address offset generator so as to shift the correspondence between said scanning line and said pointer in said pointer array memory; and (f) a second address offset generator and a second adder, said second adder being provided for adding said pointer with a second offset register generated by said second address offset generator so as to shift the attribute entry to be assigned to said scanning line being processed.

16. A cathode-ray tube controller according to claim 15 wherein said pointer array memory is provided in a RAM and said attribute array memory is provided in a ROM.

17. A cathode-ray tube controller according to claim 15 wherein each of said attribute entries comprises at least one of the following data:

(a) a starting address data attribute for providing vertical shift instructions for said scanning line;

(b) a horizontal offset data attribute for providing horizontal shift instructions for said scanning line; and (c) a scaling data attribute for providing enlargement/reduction instructions for said scanning line.

18. A cathode-ray tube controller according to claim 17 wherein each of said attribute entries further comprises a V-bit data attribute so as to allow said starting address data attribute to be entered as either an absolute or a relative value.

19. A cathode-ray tube controller according to claim 18 which further comprises:

(a) a third adder for adding said starting address data attribute with said line count data; and (b) a multiplexer disposed between said third adder and said memory address generator for selecting between said starting address data attribute and an output from said third adder in accordance with input from said V-bit attribute.

* * * * *